Sept. 27, 1932.   D. F. OTHMER   1,879,445
PROCESS OF CRYSTALLIZING SALTS FROM SOLUTIONS CONTAINING THEM
Filed Jan. 19, 1931
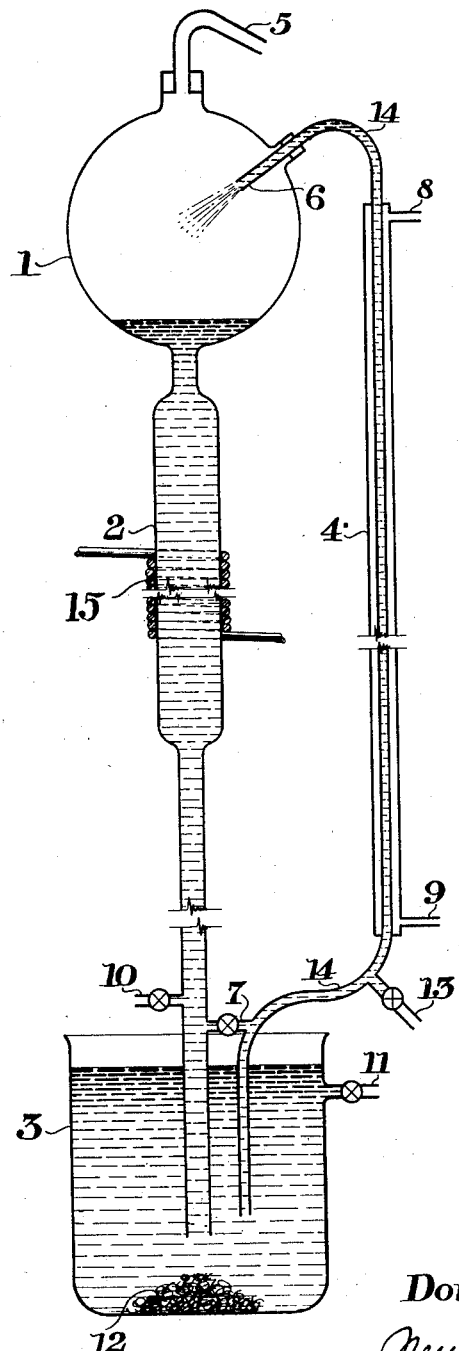
Inventor
Donald F. Othmer,
By Newton Perrin
Daniel J. Mayne
Attorneys Patented Sept. 27, 1932

1,879,445

UNITED STATES PATENT OFFICE

DONALD F. OTHMER, OF ROCHESTER, NEW YORK, ASSIGNOR TO EASTMAN KODAK COMPANY, OF ROCHESTER, NEW YORK, A CORPORATION OF NEW YORK

PROCESS OF CRYSTALLIZING SALTS FROM SOLUTIONS CONTAINING THEM

Application filed January 19, 1931. Serial No. 509,872.

This invention relates to a continuous process of obtaining salts in crystalline form from their solutions which features spraying the liquid while heated into an evacuated chamber while a current of air is continuously bubbled through the solution and withdrawn. The purification of salts of the nature of silver nitrate is particularly contemplated by this invention.

Continuous processes of obtaining salts from their solutions by evaporation and concentration by spraying the heated solution into an evacuated chamber is well known as shown for example in Figure 2 of U. S. Patent #1,006,823 to Block.

I have now found that by introducing air into the column in which the crystals settle, various advantages hitherto not previously contemplated are obtained, for instance, the crystallization and purification proceed much faster and more efficiently than formerly. This is believed to be due to the air having the effect of slowing up the settling of the crystals from the solution, thus making possible more uniform crystallization and the current of air aids in the evaporation and cooling of the sprayed liquid.

An apparatus which may be used in carrying out the present process is shown in the single figure of the accompanying drawing in which like numerals refer to like parts. The steam separating space or bowl 1 has extending down therefrom a crystallizing tube or column 2 of such a height that the level of the solution will be about at the point shown in the drawing. The height may be somewhat less than barometric height as the vacuum which is maintained is not perfect and with the injection of air the amount of evacuation is lowered to some extent. However, it is preferred that the tube 2 be of barometric height for the particular density of the solution used as the apparatus may then be used with a high amount of evacuation of the bowl and even without the injection of air. At the lower end of the crystallizing tube is a receptacle or boot 3 for receiving crystals, so arranged that the tube will always be below the surface of the solution which is present in the boot in the carrying out of the process. At a point a little above that at which the tube 2 enters the boot 3 is located an air inlet 10 provided with a suitable valve attached to tube 2. In the boot 3 is an outlet 11 to discharge mother liquor saturated at the temperature employed, if desired. This outlet is at a level above that of the end of tube 2. A small tube 14 connected with valve 7 also dips below the surface of the solution in 3 and passes up through a heater 4 which consists of a jacket provided with an inlet 8 and outlet 9 to admit steam or other hot fluid thereto. Attached to tube 14 at a point below the heater is an inlet 13 for the purpose of introducing fresh solution into the system. At the lower end of tube 14 is the crossover tube 7 provided with a valve leading to the crystallizing tube 2. When crystallization is desired it is advisable to open tube 7 so that the velocity of the solution flowing through 7 carries the smaller crystals with it and allows only the larger crystals to settle out. These smaller crystals serve as seed crystals which grow in size upon successive circulations until they become large enough to settle out. The upper terminus of tube 14 is within the bowl 1 and may be fitted with a suitable nozzle or orifice 6 to produce a finely divided spray of the liquid.

While passing through the heating space a certain amount of the water or other solvent is evaporated and the vapors thus formed elevate the unevaporated liquid through the tube so that the vapor-liquid mixture is discharged through the nozzle 6 with high velocity. The action is somewhat the same as in the ordinary air lift.

The process is carried out by heating a solution of the salt to be crystallized in the heating tube (or if desired, tubes) 4, which heating discharges the liquid in the form of a spray into the upper bowl 1 which is evacuated, and pumping off through tube 5 the solvent vapors given off by the sprayed liquid. If a solvent is used which it is desirable to recover, a condenser may be placed in tube 5 between the bowl 1 and the evacuating pump. The sprayed liquid drains into tube 2 where crystals form and separate from the surrounding liquid by gravity, settling into boot 3 where they may be removed. Air is continually bubbled into tube 2 through the inlet 10 which bubbling retards the gravity settling of the crystals so that they are larger and more perfectly formed; this current of air also passes through the spray issuing from nozzle 6 in bowl 1 thus aiding the evaporation of the solution to a marked degree.

If it should be desired merely to evaporate the solution to produce a more nearly saturated solution than that fed into the apparatus, the solution may be introduced through tube 13 and after passing through the heating, spraying etc. steps may be withdrawn through tube 11 attached to the side of the boot. The solution may be run through the apparatus a plurality of times if a rather high concentration is desired especially where the original solution is quite dilute.

When the amount of solution present in the apparatus is diminished by evaporation and removal of crystals, the solution is brought back to the proper volume by adding additional solution through inlet 13 or the replenishing solution may be added continuously in an amount just sufficient to counterbalance the loss of salt due to crystallization.

Obviously various modifications may be used in this process and apparatus as are based on prior art or obvious modifications and any of these may be carried out according to the fundamentals of my process, if desired, without going outside the scope of my invention. For instance, if desired, a cooling means such as coils 15 or the like may be placed in, surrounding or adjacent to column 2 to aid the crystallization in this tube.

The apparatus in which my invention is carried out may be made of glass, particularly where small scale operation is contemplated or it may be of corrosion resistant materials or resistant metals or both, especially in the case of large scale production.

What I claim as my invention and desire to secure by Letters Patent of the United States is:

1. In a process of crystallizing a solid from solution, in which a dilute solution is heated, is sprayed into an evacuated chamber and then is allowed to cool by passing downward in a column approximating barometric height, the step of passing air upwardly through the column of liquid and through the spray of the solution.

2. A process of crystallizing a solid from a dilute solution which comprises passing the solution through a heating element, spraying the hot solution into an evacuated chamber, passing the solution downwardly through a column of approximately barometric height while air is being bubbled upwardly through the column and passed through the spray, and separating the crystals thus formed from the solution.

3. A process of crystallizing a solid from solution which comprises heating the solution, spraying it into an evacuated chamber, passing the sprayed solution downwardly through a column of barometric height, while air is being bubbled upwardly through the column and passed through the spray, and allowing the crystals formed to settle out of the solution while in the column.

4. A process of crystallizing a solid from solution which comprises heating the solution, spraying it into an evacuated chamber, passing the sprayed solution through an artificially cooled column of barometric height, while air is being bubbled upwardly through the column and passed through the spray, and allowing the crystals formed to settle out of the solution while in the column.

Signed at Rochester, New York, this 10th day of January, 1931.

DONALD F. OTHMER.